United States Patent [19]

Singh et al.

[11] Patent Number: 5,957,777
[45] Date of Patent: Sep. 28, 1999

[54] METHOD OF MANUFACTURING FASTENERS

[75] Inventors: Jayajit Singh, Bangalore; Naresh Ummat, New Delhi, both of India

[73] Assignee: Rivet Technology ( P) Ltd., Bangalore, India

[21] Appl. No.: 09/109,638

[22] Filed: Jul. 2, 1998

[30] Foreign Application Priority Data

Jul. 4, 1997 [DE] Germany ............................ 197 28 736

[51] Int. Cl.⁶ .................................................. B21K 1/44
[52] U.S. Cl. .................................. 470/29; 470/191; 72/88
[58] Field of Search ..................................... 72/71, 88–90, 72/208, 94, 96, 97; 470/27, 28, 29, 30, 31, 18, 191, 198

[56] References Cited

U.S. PATENT DOCUMENTS

| | | | |
|---|---|---|---|
| 665,790 | 1/1901 | Ledermuller | 72/89 |
| 2,361,770 | 10/1944 | Huck | 470/29 |
| 2,825,251 | 3/1958 | Rader | 72/90 |
| 3,466,918 | 9/1969 | Marcovitch | 72/90 |
| 3,495,428 | 2/1970 | Marcovitch | 72/94 |
| 3,602,025 | 8/1971 | Awano | 72/71 |
| 3,847,001 | 11/1974 | Thamasett | 72/96 |
| 4,257,250 | 3/1981 | Vanderhorst et al. | 72/703 |
| 5,722,281 | 3/1998 | Yasuda et al. | 72/208 |
| 5,765,419 | 6/1998 | Krapfenbauer | 72/96 |

FOREIGN PATENT DOCUMENTS

| | | | |
|---|---|---|---|
| 3948 | 9/1933 | Germany . | |
| 99521 | 8/1973 | Germany . | |
| 2551156 | 5/1977 | Germany . | |
| 245827 | 5/1987 | Germany . | |
| 2-84225 | 3/1990 | Japan | 72/88 |

*Primary Examiner*—Joseph J. Hail, III
*Assistant Examiner*—Ed Tolan
*Attorney, Agent, or Firm*—Emrich & Dithmar

[57] ABSTRACT

The invention relates to a method of manufacturing fasteners such as self-piercing rivets, self-piercing studs, plugs, inserts, etc.. In such method a blank is provided and said blank is subjected to a rolling process causing material of the blank to flow radially towards said central axis and axially so as to axially lengthen the blank, with said predetermined geometry of said finished fastener being formed by said rolling process. In addition, a mandrel can be used to precisely define the geometry of the fastener. Fasteners made by the method of the invention are much cheaper than fasteners made by conventional upsetting and extrusion processes. Furthermore, the fasteners made by the method of the invention generally have the advantage of superior grain flow and closer manufacturing tolerances.

20 Claims, 4 Drawing Sheets

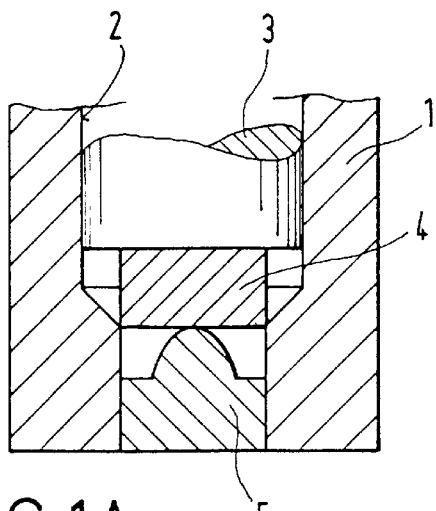
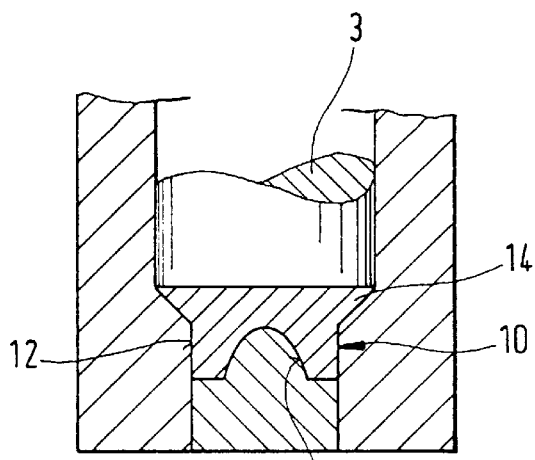
FIG.1A  FIG.1B
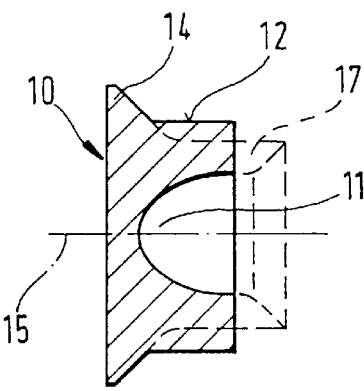
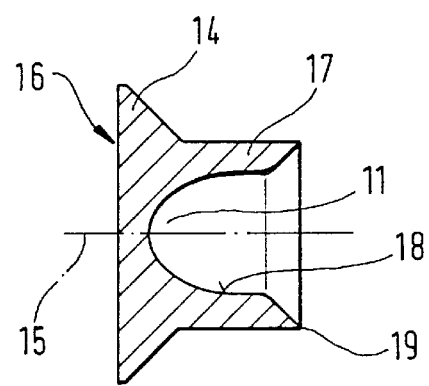
FIG.2A  FIG.2B
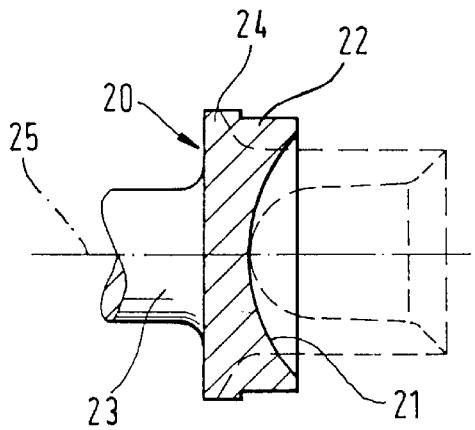
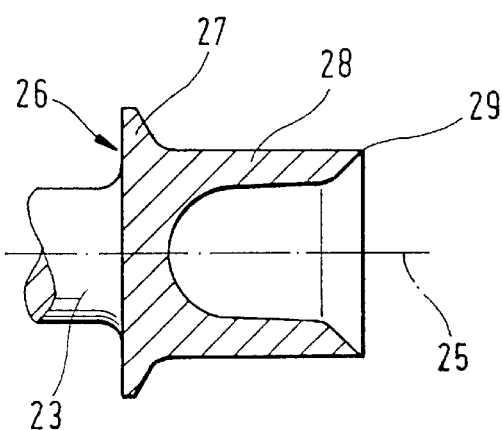
FIG.3A  FIG.3B

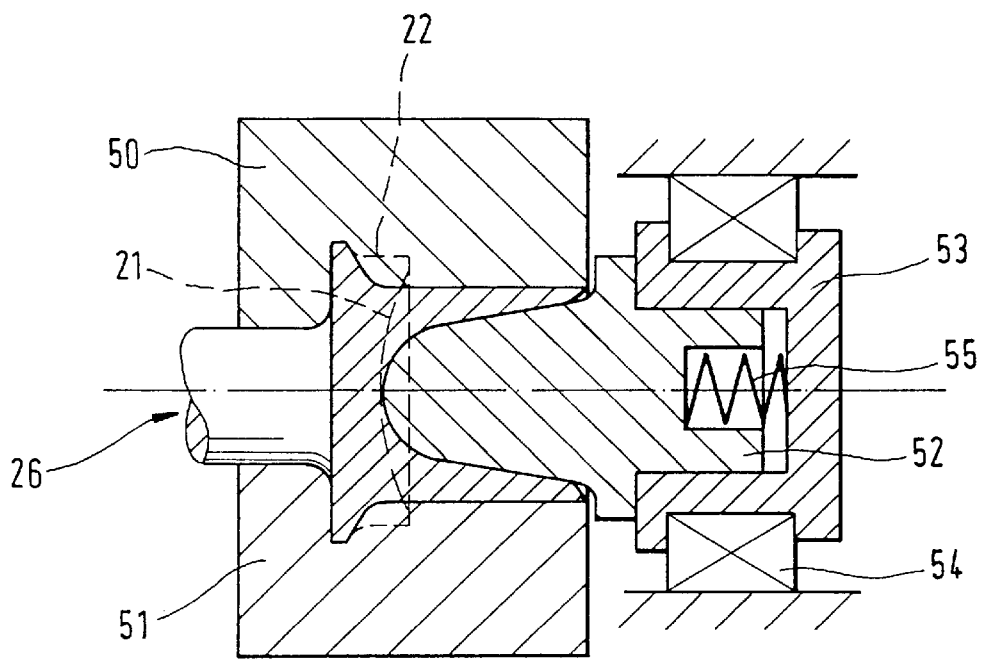
FIG.7
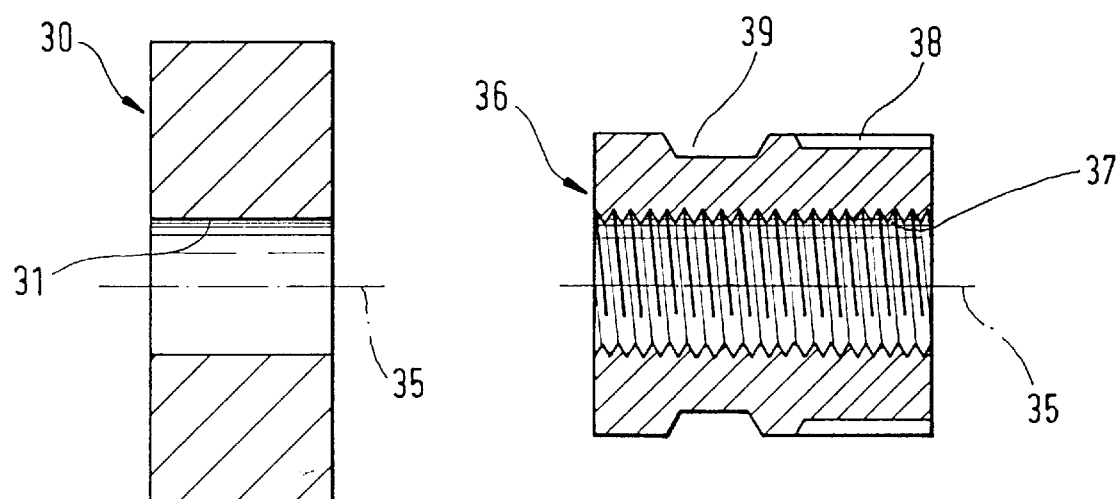
FIG.8A
FIG.8B

METHOD OF MANUFACTURING FASTENERS

FIELD OF THE INVENTION

This invention relates to a method for manufacturing fasteners in particular, fasteners having a central cavity of a predetermined geometry. Typical examples are self-piercing rivets, self-piercing bolts and studs, self-piercing nuts, plugs and threaded inserts with both inner and outer threads, expandable inserts and plugs with inner threads and outer knurls and similar small parts having an inner cavity; the cavity may be a blind-hole or a through-hole.

BACKGROUND AND SUMMARY OF THE INVENTION

According to the prior art such fasteners are conventional by manufactured by upsetting and extrusion of a length of wire in several steps. This technology requires a large number of tools and dies, and transfer of the workpiece from one step to the next requires time. Furthermore, the tools are subjected locally to very high stresses, which may detrimentally affect their service life. In addition, radial undercuts such as outer grooves and knurls or inner threads require additional operations, in many cases even costly machining. Moreover, the conventional technology has many limitations, particularly in the case of relatively deep cavities of small diameter or cross-section, especially cavities of conical shape with a small included angle, since the cavity has to be formed by a die-sided pin. Because of a self-locking effect caused by friction, it is difficult to remove the finished parts from the pin, and pins of substantial length generally lack strength and stability required for the production process. Experience has shown that cavities made in a multi-step extrusion process often have small cracks at their bottom and that the fastener shank will not have at its free end a "sharp edge" or a well-defined flat due to limitations of the presently used production technique. This results in a non-optimal setting behaviour and thus in poor joint properties both in terms of appearance and strength. Finally, due to the limitations posed by the present production techniques it is not possible to economically manufacture such fasteners of materials such as austinitic stainless steel by cold-forming.

It is an object of the present invention to provide a method of manufacturing fasteners which does not suffer from the above-mentioned disadvantages and limitations. Such method should allow to make fasteners and similar parts which, as regards depth and geometry of the central cavity, do not have the above-mentioned limitations. In addition, the production process is to be simplified, the output per unit time is to be increased, and both the economics of the method as well as the quality of the products are to be improved. Furthermore, the method of the invention should allow to economically produce fasteners of materials which are difficult to process by using conventional upsetting and extrusion methods.

To this end, the present invention provides a method of manufacturing a fastener of a predetermined geometry and having a central axis and a central cavity, in which method a blank is provided and said blank is subjected to a rolling process causing material of the blank to flow radially towards said central axis and axially so as to axially lengthen the blank, with said predetermined geometry of said finished fastener being formed by said rolling process.

In accordance with the invention the blank is generally made from a sheared-off length of wire. The end faces of the blank may be planar; alternatively one end face thereof may be provided with a recess obtained by upsetting and/or extrusion.

Subsequently, the blank is formed into the finished fastener by a rolling process. Such rolling process causes the material of the blank to flow radially towards the center of the blank and axially such that the length of the preformed blank is increased and the required geometry of the finished fastener is obtained. The result is a fastener with a cavity of a desired geometry even when starting from a blank having planar end faces.

If, on the other hand, the blank is preformed so as to have a recess at one of its end faces, the rolling process causes material of the blank to flow from an area radially outwards of the cavity radially inwards and in an axial direction until the fastener will obtain its final shape.

The rolling process is a single stage operation, i.e. the rolling dies form the finished fastener out of the blank in a single step. A pre-requisit for this is that the profile of the rolling dies changes continuously—along the length of the rolling dies—from a profile corresponding to that of the blank up to that of the finished fastener.

Various types of rolling tools are suitable for performing the rolling process, namely such having flat rolling dies which are linearity movable with respect to each other, rotary cylindrical rolling dies, and rolling dies of cylindrical segments. In each case the tools are provided at their opposite outer surfaces with a continuously changing profile. When a pair of cylindrical rollers or rollers segments are employed, a stationary straight edge is used to support and guide the blank during rolling. In another version three rollers are used for providing the fasteners with a predetermined external profile by embossing. Such rolling tools are known in the art and have been conventionally used e.g. for roll-forming of threads on rods, screws and bolts. A major difference between the prior art and the invention is that in case of the latter the rolling process is employed for producing hollow or semi-hollow parts of defined outer and inner geometries.

The method of the invention can be practiced with or without a mandrel. As has been mentioned already, a central cavity of the fastener may be obtained simply by rolling. If, however, a precisely defined geometry of the central cavity is to be attained, it is preferred to use a rotating mandrel which is axially spring-loaded and which is urged into a recess of the blank. Since flow of material is radial from the outside to the inside, there is no self-locking tendency; due to the mandrel being spring-loaded, there will be a gap between the finished fastener and the mandrel, which facilitates removal of the finished fastener from the mandrel.

On the other hand, the method of the present invention allows to make fasteners having through-holes. In this case it is advisable to use a blank provided with a hole. Again the rolling process causes material to flow in both radial and axial directions until the desired geometry will be obtained. It is advisable to use a mandrel for producing a cylindrical bore. The mandrel may be provided with outer threads so that the fastener will be provided with internal threads by the rolling operation. The outside of the fastener may be of cylindrical or polygonal shape.

In particular for making self-piercing rivets and self-piercing nuts the volume of the blank should be greater than the calculated volume of the finished fastener, with the excess volume being dependent on the diamter and the length of the blank. The excess volume should be about between 0.5% and 2% of the volume of the finished fastener.

The excess volume ensures that the length of the fastener can be maintained substantially constant, while the excess volume of the blank may result in a slight excess volume of the finished fastener, for example at the head of the fastener where no precise dimensions are required. This allows to precisely design the self-pierc-ing ends of the shanks of self-piercing rivets so that they are particularly suited to perform the self-piercing operation in the setting process.

BRIEF DESCRIPTION OF THE DRAWINGS

Preferred embodiments of the invention will be described in more detail with reference to the accompanying drawings wherein:

FIG. 1A is a longitudinal section of a die for extrusion of a blank;

FIG. 1B is a view similar to FIG. 1A after the extrusion operation;

FIG. 2A is a longitudinal section of a blank for a self-piercing rivet, with the self-piercing rivet having been indicated by dotted lines;

FIG. 2B is a view similar to FIG. 2A of the finished self-piercing rivet;

FIG. 3A is a longitudinal section of a blank for a self-piercing stud, with the finished stud having been indicated by dotted lines;

FIG. 3B is a view similar to FIG. 3A of the finished self-piercing stud;

FIG. 7 is a cross-sectional view of a pair of rolling dies and a rotary mandrel for making a self-piercing stud as shown in FIG. 3B;

FIG. 8A is a cross-sectional view of a blank for an insert;

FIG. 8B is a cross-sectional view of an insert made from the blank in FIG. 8A;

DESCRIPTION OF PREFERRED EMBODIMENTS

Figure 4:
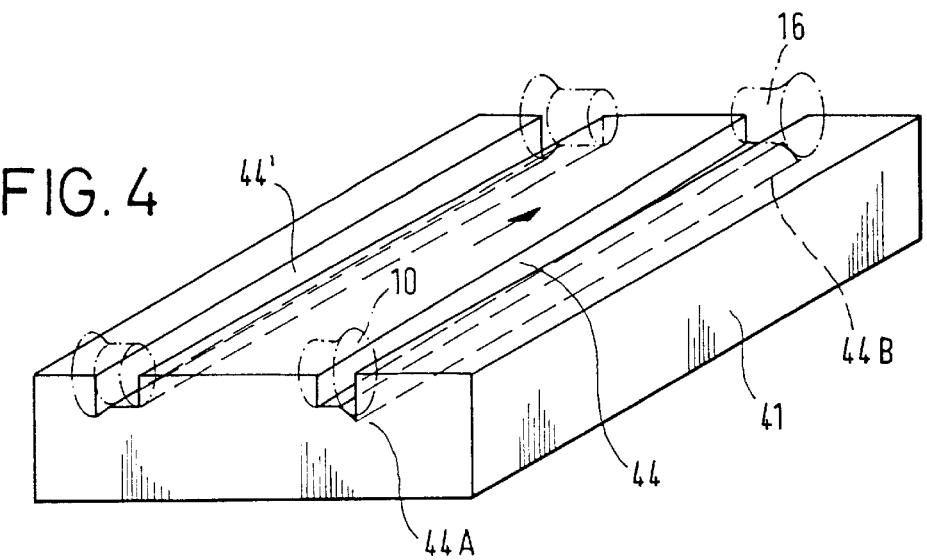
FIG. 4 is a perspective view of a rolling die.

FIG. 1A shows a die 1 including a punch 3 displaceable within a bore 2. A length of wire 4 is inserted into the die 1 which includes an ejector with a mandrel 5 at its bottom. Displacing the punch 3 causes the length of wire 4 to be deformed from the shape in FIG. 1A to that of FIG. 1B; the mandrel 5 helps to form a cavity 11 which is disposed centrally with respect to the cylindrical periphery 12 of the blank. A flange 14 extends from the cylindrical periphery 12.

The result is a blank 10 as shown in FIG. 2A, the central axis of which has been designated by 15.

Thereafter the blank 10 is subjected to a rolling process so as to deform the blank into the finished self-piercing rivet 16 as shown in FIG. 2B. A comparison of the geometry of the finished fastener 16 in FIG. 2B with that of the preformed blank 10 in FIG. 2A shows that the rolling process causes material radially outwards of cavity 11 to flow radially inwards and in an axial direction so that a hollow shank 17 as shown in FIG. 2B will be formed. In FIG. 2A the hollow shank 17 is indicated by dotted lines in order to facilitate a comparison of the shapes before and after the rolling process. The factors decisive for the final inner geometry of cavity 18 are the shape (profile) of the rolling dies and the geometry of the preformed blank.

Figure 5:
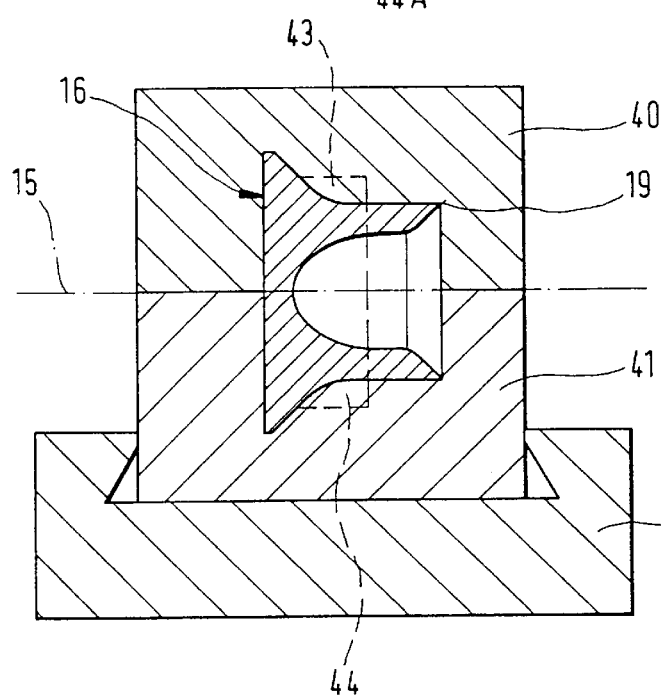
FIG. 5 is a cross-sectional view of a pair of rolling dies for making a self-piercing rivet according to FIG. 2B.

A rolling tool for making the self-piercing rivet 16 is shown in FIGS. 4 and 5. In FIG. 5 a lower rolling die 41 is mounted in a support 42 so as to be stationary, and an upper rolling die 40 is mounted so as to be linearily movable back and forth by a not shown drive means so as to perform reciprocatory movements in a direction perpendicular to the plane of the drawing.

Both rolling dies 40 and 41 are provided with continuous, longitudinally extending rolling profiles 43 and 44.

FIG. 4 is a perspective view of the lower rolling die 41 with its profiles 44 and 44' at its upper surface. The profile 44 changes continuously from the geometry 44A at the start corresponding to that of the blank 10 to the geometry 44B at the end corresponding to that of the finished self-piercing rivet 16. The upper rolling die 40 not shown in FIG. 4 is of a mating rolling profile. Furthermore, FIG. 4 shows that each rolling die 40, 41 may be provided with two or even more profiles 44 and 44'.

From the above it follows that the external geometry of the self-piercing rivet 16 is defined by the profile of the rolling dies at their end. The internal geometry of the hollow shank 18 depends on the geometry of the blank 10 and the shape of the profiles of the rolling dies. Rolling dies having profiles of identical geometry at the end, however of different geometries along their length will produce hollow shanks 18 of different internal geometries. In order to make a finished fastener of predetermined dimensions it is necessary to use a blank of a volume in excess of the theoretical volume required for the finished fastener. The excess volume should be more than between 0.5% and 2.0%. This allows to obtain a precise and sharp-cutting edge 19 (FIG. 2B) at the end of the hollow shank 17.

The rolling dies shown in FIG. 5 allow to form a self-piercing rivet 16 having a hollow shank 17 the cross-section of which increases towards head 14. The cutting edges 19 are precisely formed and sharp-edged such that they can cut through the top sheet during the self-piercing rivetting operation with a minimum of distortion and warpage.

FIG. 3A shows a blank 20 of another cross-sectional shape, i.e. a blank having a collar 24 at its outer periphery and radially inwards therefrom a cylindrical portion 22 with a cross-shaped cavity 21. The blank 20, furthermore, is provided with a shank portion 23. The central axis and axis of rotational symmetry of blank 20 is designated by 25.

FIG. 3B shows the finished fastener which is a self-piercing stud 26 including a head 27 formed by the rolling operation. The sharp-edged foot end of the hollow shank 28 has been indicated by reference numeral 29.

FIG. 7 shows a pair of rolling dies 50, 51 being of a respective profile for forming self-piercing rivets as shown in FIG. 3B. The two rolling dies 50, 51 are drivable so as to perform lineal reciprocatory movements with respect to each other along an axis normal to the plane of the drawing. A mandrel 52 which is mounted in a support 53 so as to be displaceable and non-rotatable engages into the cavity 21 of the blank 20. The support 53 is rotatably mounted in a bearing 54. The mandrel 52 is urged into the cavity 21 by a spring 55. During the rolling operation material flows from the cylindrical portion 22 of the blank into the gap between the rolling dies 50, 51 and the mandrel 52. As a result, the geometry of the bore of the self-piercing stud is determined by the geometry of the mandrel 52. The necessary longitudinal displacement of the mandrel 52 may be caused by a drive or may result from friction forces occurring when material flows along the mandrel 52 during the rolling operation. As shown in FIG. 7 the mandrel 52 is biased by spring 55 so that it can be displaced in the longitudinal direction during progression of the rolling operation due to the spring being compressed.

Figure 6:
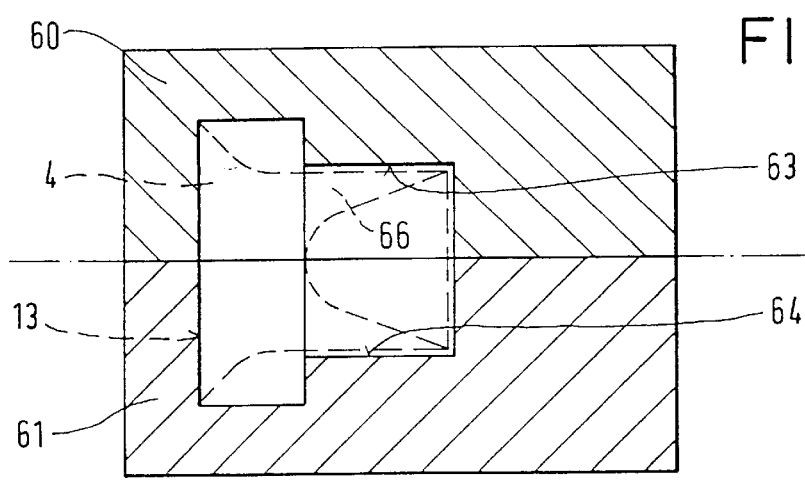
FIG. 6 is a cross-sectional view of a pair of rolling dies for making a self-piercing rivet from a blank without cavity.

FIG. 6 is a cross-sectional view of a pair of rolling dies 60, 61. The lower stationary rolling die 61 has a rolling profile 64, and the upper movable rolling die 60 has a mating rolling profile 63. This pair of rolling dies 60, 61 permits to form a self-piercing rivet 66 from a cylindrical blank 4 comprising a length of wire as shown in FIG. 1A. Again a finished fastener 66 having a tapered cavity as shown in FIG. 6 by dotted lines is obtained by rolling a blank 4 having a planar end face 13.

FIG. 8A shows a blank 30 for making an insert 36 as shown in FIG. 8B. In this case the cavity 31 is in the shape of a through-hole. Forming the insert 36 from the blank 30 is obtained again by a rolling process using a mandrel which is provided with outer threads. The mandrel is inserted into the through-hole 31 before the rolling operation. During the rolling operation material flows between the mandrel and the rolling dies. In this manner the insert 36 will be provided with internal threads 37, with knurls 38 at the outer periphery thereof, and with for example a hexagonal peripheral portion 39 for engagement by a tool. The rolling tool may be of the type as shown in FIG. 7. The mandrel 52 shown in FIG. 7 will then be replaced by a threaded mandrel.

It is possible to only locally roll onto the outside contour of the hollow shank 17 (FIG. 2B) or 28 (FIG. 3B) a profile P which is e.g. polygonal or fluted with the aim of reducing stresses at the most highly stressed areas. Thus, the strength of the shank can be enhanced in areas where big stresses occur during the setting process due to rivet flaring. This allows to reduce the pressure per unit area and thus to improve the fatigue behaviour of riveted joints. The modification of the outside contour may be locally limited.

Figures 9A, 9B:
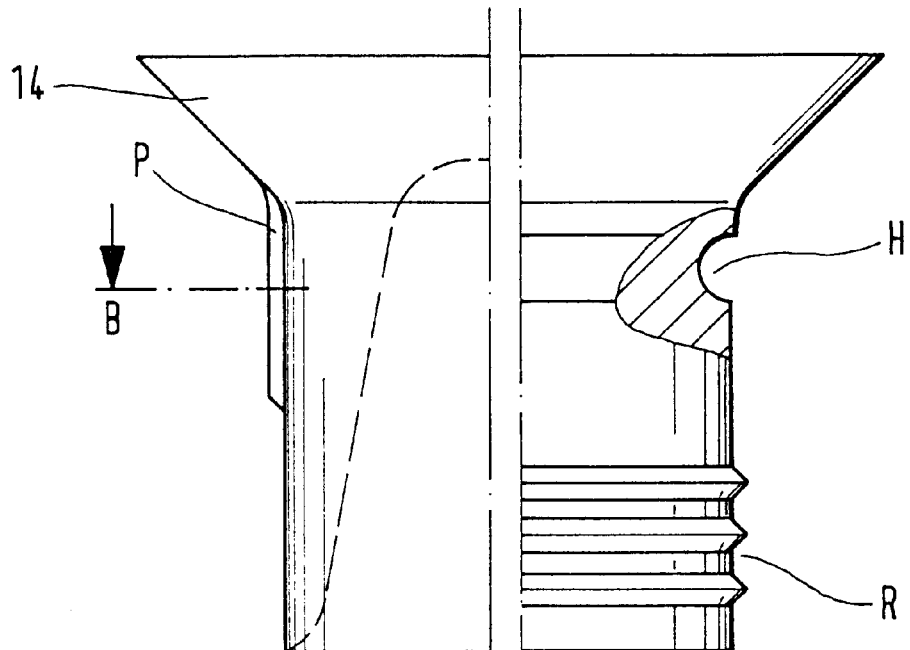
FIGS. 9A and 9B are side elevations of self-piercing rivets of different external profiles.
Figure 10:
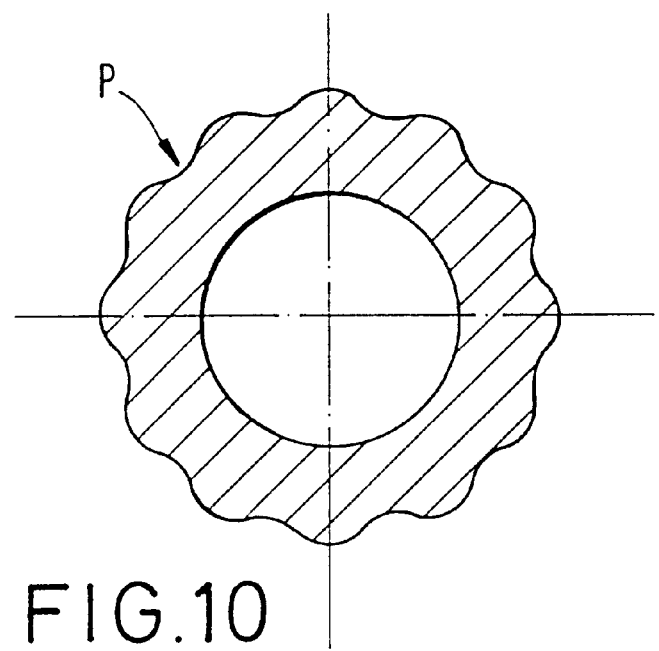
FIG. 10 is a sectional view in the direction of arrow B in FIG. 9A to show the external profile of the self-piercing rivet.

FIGS. 9A and 10 show a fastener of a non-circular profile P below head 14, while FIG. 9B shows a fastener having a knurled profile R. In a similar manner various outer and inner profiles of the hollow shank can be produced. For example, it is possible to produce undercut profiles. Such a profile is shown e.g. at H in FIG. 9B.

We claim:

1. A method for manufacturing a fastener of a first geometry and having an internal cavity, comprising the steps of:

providing a blank of a second geometry different from said first geometry, said blank having an end face extending transversely to a central axis of said blank;

providing a pair of rolling die means defining a rolling gap of a cross-section which continuously changes from a profile corresponding to said second geometry to a profile corresponding to said first geometry; and subjecting said blank to a rolling process in said rolling gap such that said blank performs a rolling movement about its central axis relative to said pair of rolling die means, with said end face of said blank remaining in contact with an axially fixed abutment surface of said rolling gap, in order to cause material of the blank to flow from said end face substantially only in an axial direction away from said end face and a radial direction towards said central axis so as to increase the axial dimensions and decrease the radial dimensions of said blank to obtain the finished fastener of said first geometry.

2. A method as defined in claim 1, wherein said blank has a recess at said end face and said rolling process causes material of the blank to flow from an area radially outward of said recess axially and radially towards said central axis.

3. A method as defined in claim 2, wherein said recess is in the shape of a cup.

4. A method as defined in claim 2, wherein said recess is in the shape of a flat trough.

5. A method as defined in claim 2, wherein said recess is in the shape of a cylindrical throughbore.

6. A method as defined in claim 1, wherein said blank is made by an upsetting and/or extrusion process.

7. A method as defined in claim 1, wherein the blank and/or the finished fastener includes a head.

8. A method as defined in claim 7, wherein said head comprises a radially extending flange.

9. A method as defined in claim 1, wherein the fastener is provided with a circumferential section of a polygonal shape.

10. A method as defined in claim 1, wherein the fastener is provided with knurls by a rolling operation.

11. A method as defined in claim 1, wherein the fastener is self-piercing rivet including a shank and said rolling process is performed such that said shank is provided with a profiled periphery for increasing the strength of said shank.

12. A method as defined in claim 1, wherein a mandrel is used in said rolling process to form said central cavity.

13. A method as defined in claim 12, wherein an end of said mandrel extends into a recess of the blank during said rolling process.

14. A method as defined in claim 12, wherein said mandrel includes outer threads so as to provide said fastener with internal threads.

15. A method as defined in claim 12, wherein said mandrel is supported so as to be axially resiliently yieldable.

16. A method as defined in claim 1, wherein said pair of rolling die means are linearly movable in opposite directions.

17. A method as defined in claim 1, wherein said rolling die means include a lineal edge in said rolling gap.

18. A method as defined in claim 1, wherein said blank is of a volume exceeding a calculate volume of the fastener.

19. A method as defined in claim 16, wherein said rolling die means are provided with two or more rolling profiles for producing a respective number of fasteners at the same time.

20. A method as defined in claim 17, wherein said rolling die means are provided with two or more rolling profiles for producing a respective number of fasteners at the same time.

* * * * *